US005871795A

United States Patent [19]
Roth

[11] Patent Number: 5,871,795
[45] Date of Patent: Feb. 16, 1999

[54] METHOD FOR MODIFYING PH TO IMPROVE QUALITY OF MEAT PRODUCTS

[75] Inventor: Eldon Roth, Dakota Dunes, S. Dak.

[73] Assignee: Freezing Machines, Inc., Dakota Dunes, S. Dak.

[21] Appl. No.: 803,322

[22] Filed: Feb. 21, 1997

Related U.S. Application Data

[63] Continuation-in-part of Ser. No. 647,470, May 9, 1996, abandoned, which is a continuation-in-part of Ser. No. 374,245, Jan. 17, 1995, abandoned.

[51] Int. Cl.$^6$ ..................................................... A23B 4/16
[52] U.S. Cl. .......................... 426/319; 426/129; 426/312; 426/315; 426/418
[58] Field of Search ................................... 426/129, 312, 426/315, 319, 418, 332, 623

[56] References Cited

U.S. PATENT DOCUMENTS

| | | | |
|---|---|---|---|
| 3,023,109 | 2/1962 | Hines | 426/263 |
| 3,119,696 | 1/1964 | Williams | 426/263 |
| 3,122,748 | 2/1964 | Beebe, Jr. | 426/263 |
| 4,919,955 | 4/1990 | Mitchell | 426/263 |
| 5,393,547 | 2/1995 | Balaban et al. | 426/330 |
| 5,433,142 | 7/1995 | Roth | 99/474 |

FOREIGN PATENT DOCUMENTS

| | | |
|---|---|---|
| 671527 | 10/1963 | Canada . |
| 9317562 | 9/1993 | WIPO . |

OTHER PUBLICATIONS

Smol'skii et al. "Method for Storage of Meat" Pub No. 77/02):S0225 1976.

Dialog Ascension No. 00211466; Registry No. 81–11–r0743, Waller, P.F., "Spoilage and Spoilage Indicators in Shark Held in Ice." *South Australia Fishermen's Co–operative, Ltd.* Food Technology in Australia. 1980,32 (3) 161–164,166. (Abstract for Journal Article).

Dialog Ascension No. 00223193;Registry No. 82–07–m0773. Montgomery,R.R.,Nofsinge,G.W., Bothast, R.J. "Preservation of High–Moisture Maize–A Comparison of Gaseous and Liquid Anhydrous Ammonia to Methylene–bis–propionate." *Bulliten of Grain Technology.1979*, 17 (3) 171–178 (Abstract for Journal Article).

Dialog Ascension No.00321821;Registry No.86–08–h0028, Means,E.G., III,Tanaka,T.S. Otsuka,D.J.,McGuire,M.J. "Effects of Chlorine and Ammonia Application Points on Bacterial Efficiency." *Journal American Water Works Association.* 1986,78 (1) 62–69,14. (Abstract for Journal Article).

Eckhoff,S.R.,J.F.Tuite,G.H.Foster,A.W.Kirleis, and M.R.Okos. "Microbial Growth Inhibition by SO2 or SO2 plus NH3 Treatments During Slow Drying of Corn." *Cereal Chemistry.* 1983, 60 (3) 185–188.

Haian Fu and Robert H. Burris. "Ammonium Inhibtion of Nitrogenase Activity in Herbaspirillum seropidacae.", Journal of Bacteriology Jun. 1989, pp. 3168–3175.

Anand, C.P. and T.M.Rudra Setty. "Studies on the Chemical Control of Psychrophilic Bacterial Spoilage of Fish. iv–The Effect of Chemical Preservatives on the Growth of Psychorphilic Bacteria Isolated from Marine Fish." *Fishery Technology* 1981,18 (1) 55–57.

Goodfellow, S.J., F.M.Bordeaux, B.A.Masters, W.L.Brown, and M.R. Johnston. "How to Cope with Product Exposure to Ammonia." Oct. 1978, pp. 32–33.

Jay, J.M. 1986. "Sources, Types, Incidence, and Behavior of Microorganisms in Food." *Modern Modern Food Microbiology.* 3rd Ed. Ch. 3 pp. 52–56 Ch. 4 pp. 71–72.

*Primary Examiner*—Lien Tran
*Attorney, Agent, or Firm*—Russell D. Culbertson; Shaffer & Culbertson

[57] ABSTRACT

A pH increasing gas is placed under an operating pressure and in contact with the surface of a meat product to be treated. Keeping the pressurized pH increasing gas in contact with the meat product for an operating period increases the pH of the meat product at its surface. The increased pH reduces bacterial activity and helps maintain the quality of the meat product during storage. The method may also include placing a pH lowering gas at a neutralizing pressure in contact with the surface of the meat product and holding the pH lowering gas in contact with the meat product at the neutralizing pressure for a neutralizing period sufficient to bring the pH of the meat product back to a normal level. The method may further include the step of removing the treatment gas and any reaction materials either after releasing the pH increasing gas or after treating with the pH lowering gas if that step is employed.

11 Claims, 8 Drawing Sheets

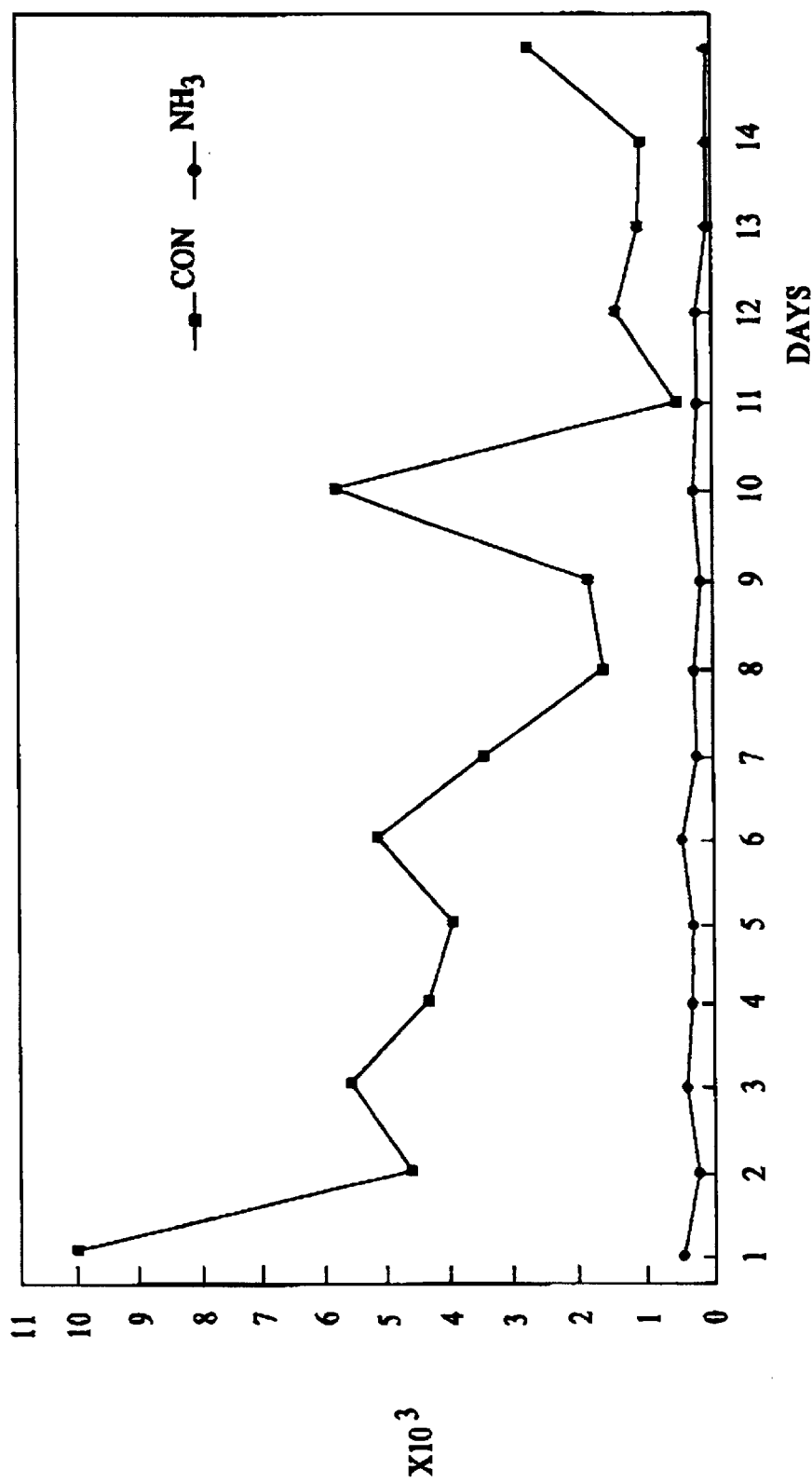

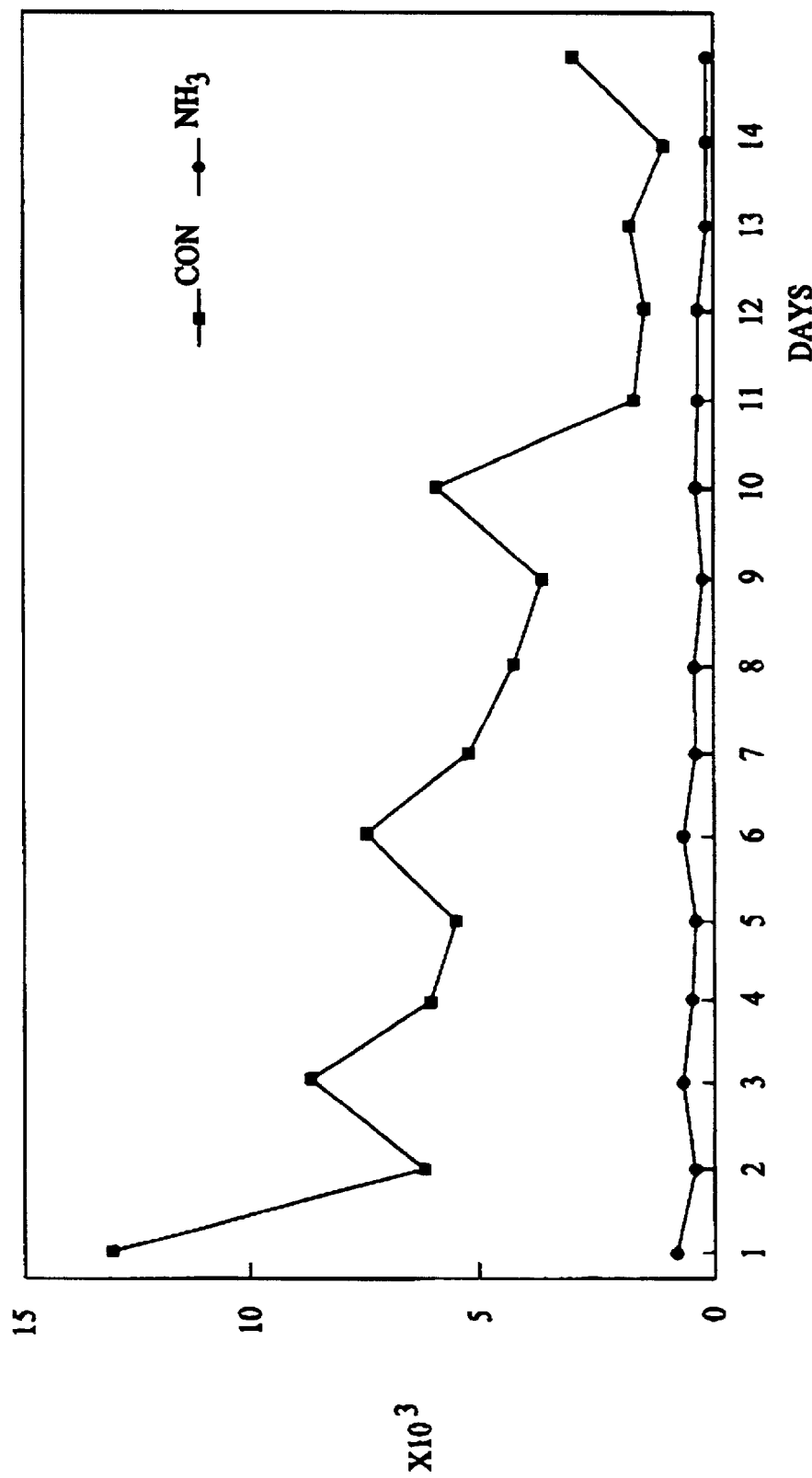

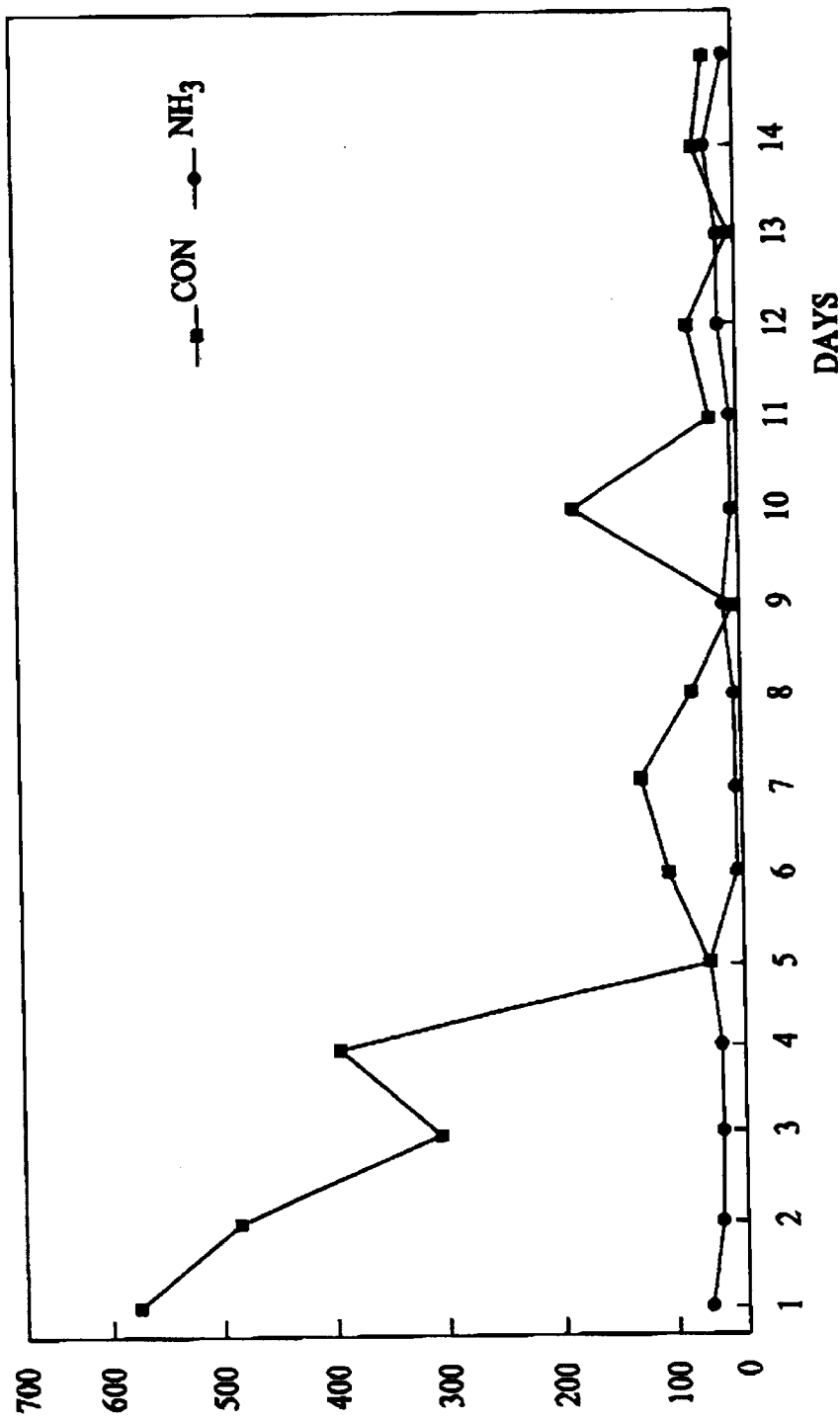
FIG. 8 TOTAL STAPHAUREUS

METHOD FOR MODIFYING PH TO IMPROVE QUALITY OF MEAT PRODUCTS

This application is a continuation-in-part of application Ser. No. 08/674,470 filed May 9, 1996 now abandoned, which was a continuation-in-part of Ser. No. 08/374,245 filed Jan. 17, 1995, now abandoned.

BACKGROUND OF THE INVENTION

This invention relates to food processing. More particularly, the invention relates to a method for improving the quality of meat products by manipulating the pH of the meat product.

Almost all foods are processed in some way before reaching the consumer. Meat products, for example, are separated from unusable or undesirable elements or components, ground or chopped, mixed or blended, and often times frozen for distribution. Even lightly processed meats are cut, trimmed, and then packaged for sale or distribution.

Microbes are part of the natural decay process of organic material and invariably appear or grow in foodstuffs as they are processed or handled. Although some microbes may be relatively benign, others contribute to spoilage and some can cause serious illness if consumed. Lactic acid producing bacteria are examples of benign microbes while some strains of *E. Coli*, Salmonella, Staph, and Listeria bacteria are examples of pathogens and can cause serious illness.

It is, therefore, desirable to control the growth of pathogen microbes or reduce pathogen microbe count in foodstuffs. Historically, microbe growth has been reduced by chemical preservatives that remain in the product and are ultimately ingested by the consumer. Chemical preservatives, however, may have undesirable side effects to consumers and, in any event, a growing population has expressed a desire for food products that are free of traditional chemical preservatives. Alternatively to traditional chemical preservatives, heat has been used to kill microbes in foodstuffs. However, heat processing or sterilization often has an undesirable effect on the quality or characteristics of the foodstuff and may make the product undesirable to the consumer. Also, heat sterilization in meats can kill all microbes, leaving the meat susceptible to the rapid growth of dangerous microbes or pathogens after sterilization, should the previously sterilized meat be exposed to pathogens.

U.S. patent document, Ser. No. 08/210,571, now U.S. Pat. No. 5,433,142, was directed to an apparatus and method for improving the quality of a foodstuff by treating the product with a pressurized gas in contact with the product. The method of treatment according to that invention included placing the gas under an operating pressure in contact with the foodstuff and holding the pressure for an operating period. After the operating period, the method continued with releasing the gas pressure, preferably instantaneously. The exposure to the pressurized operating gas and then rapid decompression killed microbes on or near the surface of the foodstuff. Although the exact mechanism by which this pressurized gas treatment operated to kill microbes is not fully understood, it is believed that the physical action of gas decompression damaged the microbe cells to kill the microbes. In any event, the invention set out in U.S. Pat. No. 5,433,142 did not modify the treated foodstuff chemically and relied upon the pressure/decompression step to physically damage microbes.

SUMMARY OF THE INVENTION

It is a general object of the invention to provide an apparatus and method for improving the quality of meat generally, and particularly for retarding microbe growth and reducing microbe content.

To accomplish this object the method according to the invention uses a pH increasing gas in a pressurization and pressure release cycle. The method includes placing the meat product in contact with the pH increasing gas under an operating pressure and holding the pressure for an operating period. After holding the operating pressure on the pH increasing gas and meat product for an operating period, the method includes releasing the pressure, preferably suddenly. The operating period is a period sufficient to raise the pH at the surface of the meat product to a desired level, and may be a very short period of time on the order of seconds or fractions of a second, or may be longer depending primarily upon the treatment pressure.

As used in this disclosure and the following claims, the "surface" of the meat product means generally any surface that may be exposed to the pH increasing gas. For example, the surface of ground meat may include the entire surface of each piece of ground meat and not just the surface of the aggregate made up of individual ground pieces.

While the pH increasing method is described herein as utilizing a pH increasing gas, preferably $NH_3$ gas, it will be readily apparent that the pH increasing material itself need not be a material in a purely gaseous phase. Rather the pH increasing "gas" may comprise a suitable pH increasing material in liquid form atomized and mixed with a gas such as Nitrogen, Oxygen, or Helium that does not interfere with the pH increasing material. Therefore, as used in this disclosure and the following claims "pH increasing gas" shall mean a purely gaseous material or an atomized or otherwise mixed pH increasing material combined with a carrier gas.

The pH increasing method may take advantage of two separate mechanisms to reduce or control microbe count in meat products. First, using relatively high pressures in the pressurization and release cycle is thought to physically damage the microbe cell structure to kill microbes. Second, regardless of treatment pressure, it has been found that increasing the pH of the meat product retards microbial activity in the product. It is believed that the increased pH retards microbial activity by tying up free water in the meat product, thereby limiting microbial propagation. Tests indicate that potentially harmful types of microbes such as *E.Coli*, Coliform, and Staph Aureus strains are particularly inhibited by the pH treatment according to the invention, while benign strains are less affected. The pH increasing method according to the invention may also be performed at low pressures at or near atmospheric pressure, depending upon the treatment temperature in which case there may be little effect on existing microbe count in the meat product, although the resulting pH increase would retard microbe growth.

The pH increasing gas is held at the operating pressure for an operating period sufficient to allow the pH increasing gas to be absorbed into the meat product and effect the desired increase in pH. A relatively higher operating pressure produces the desired pH effect in a relatively shorter operating period compared to a lower operating pressure. In order to reduce the operating period to acceptable levels, the operating pressure must be at or above the vapor pressure of the pH increasing gas at the temperature of the meat product being treated. A shorter operating period is important in order to prevent any undesired effects from placing the meat in contact with the pH increasing gas. For example, $NH_3$ has been found to effect the texture of beef when left in contact with the beef for even short periods of time. Using operating pressures above the pH increasing gas vapor pressure facilitates the desired pH increase without producing the undesirable side effects to the meat.

The method of the invention may be performed as a batch process or a continuous process with apparatus such as that disclosed in U.S. Pat. No. 5,433,142. In either case, the apparatus for performing the process includes a container for containing the meat product and pH increasing gas and also means for placing the meat product and pH increasing gas in the container and for removing the meat product and pH increasing gas from the container after treatment. The continuous process apparatus also preferably includes means for compressing the pH increasing gas in contact with the meat product to the operating pressure and means for releasing the pressure after the operating period. In the batch process, the meat product may be held in a pressure vessel and pH increasing gas introduced into the vessel under the desired operating pressure.

In order to help maintain the increased pH in the treated meat during distribution or storage, the method according to the invention may also include packaging the treated meat in an atmosphere containing the pH increasing gas. The treated and packaged meat is then maintained at an appropriate temperature to retain the pH increasing gas in contact with the meat and therefore help maintain the pH at the increased level.

Although the pH increasing treatment may be used by itself, the treatment process according to the invention may also include treating the pH modified meat product with a pH lowering gas such as carbon dioxide gas in a pressurization, hold, and release cycle to reduce the pH of the meat product. As with the pH increasing gas the pH lowering gas need not be an actual gas but may instead be a suitable pH lowering liquid or even solid atomized or mixed with an inert carrier gas. In any event the method includes placing the pH increased meat product in contact with the pH lowering gas under a neutralizing pressure and maintaining the pressure for a neutralizing period sufficient to decrease the pH of the meat product to the desired level.

The preferred form of the invention also includes the step of releasing or removing the treatment gas, either pH increasing or decreasing gas, from contact with the treated meat. The gas releasing or removing step serves to remove any excess or free treatment gas from the meat being processed. In one form of the invention, the gas releasing or removing step may include rinsing the surface of the previously treated meat product with a suitable inert gas or a liquid. In another preferred form of the invention, the gas releasing or removing step includes placing the previously treated meat under a vacuum to draw off excess gas from the treated product. In addition to applying a vacuum to the treated product, the product may be agitated or blended while applying the vacuum and also the temperature of the treated product may be increased to help release gas from the product.

The method according to the invention has been shown to significantly reduce microbial growth on meat products while such products are stored or distributed. Also, treatment with anhydrous $NH_3$ gas has been shown to improve the color substantially, both at the time of treatment and during storage. Yet the method accomplishes this reduced microbial activity and improved color without reducing the desirability of the meat product to consumers as is the case with heat treatment and with traditional chemical preservatives.

These and other objects, advantages, and features of the invention will be apparent from the following description of the preferred embodiments, considered along with the accompanying drawings.

BRIEF DESCRIPTION OF THE DRAWINGS

FIG. 6 is a graph of total *E. coli* count over time measured in days for a sample treated as described in Example 2 below, and for a control sample.

FIG. 7 is a graph of total Coliform count over time measured in days for a sample treated as described in Example 2 below, and for a control sample.

FIG. 8 is a graph of total Staph aureus count over time measured in days for a sample treated as described in Example 2 below, and for a control sample.

DESCRIPTION OF THE PREFERRED EMBODIMENTS

Figure 1:
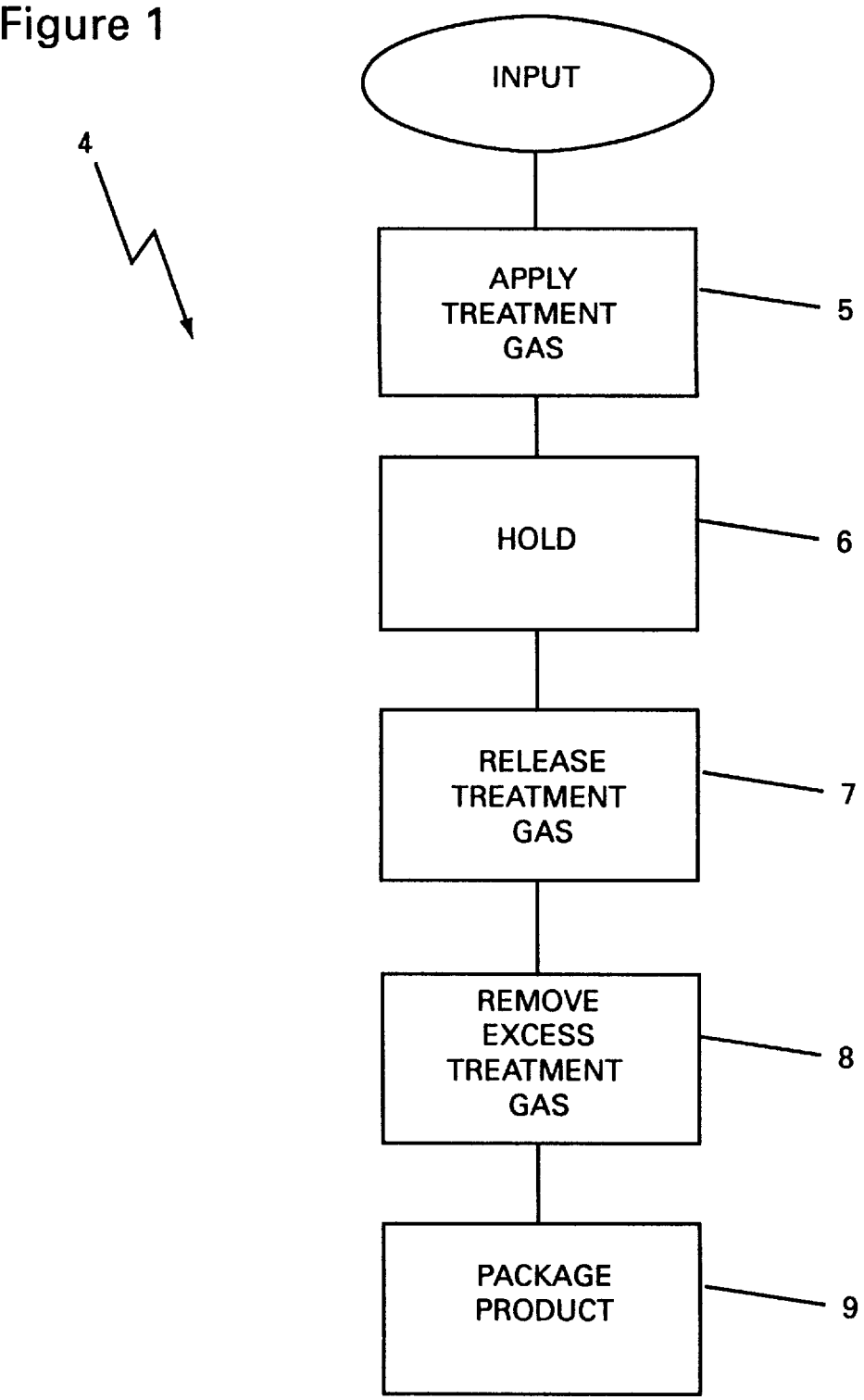
FIG. 1 is a block diagram showing method steps performed according to one preferred form of the invention.

FIG. 1 illustrates a method embodying the principles of the invention for modifying pH of a meat product. The illustrated method generally shown at reference numeral 4 may be used in two different fashions according to the invention. When the treatment gas is a pH increased gas, the method operates to increase the pH of the meat product being processed. A pH lowering or neutralizing gas may be used in this same procedure to reduce the pH of the meat product back to a desired level. This pH lowering or neutralizing step, however, may not be necessary or desirable depending upon a number of factors including the level of increased pH produced with the pH increasing steps and the nature of the meat product being processed.

For increasing the pH of a meat product, the method 4 shown in FIG. 1 includes first, at block 5, placing a pH increasing gas under a desired operating pressure in contact with the surface of the meat product to be processed. As shown at block 6, the method next includes holding the gas and meat product under the operating pressure for an operating period sufficient to increase the pH of the meat product to a desired level. After holding the meat product and the pH increasing gas under the operating pressure for the operating period, the method depicted in FIG. 1 includes releasing the gas pressure at block 7. This releasing step is preferably done quickly or instantaneously to put the maximum physical stress on the microbes then existing in the meat product. Depending upon the gas, the pressures used, and the time that the pressure is held on the meat product, the physical stress of gas pressure release alone may be sufficient to produce significant microbe kill. However, the pH increasing gas according to the current invention also leaves at least the surface of the meat product with a desired increased pH level which further inhibits microbial growth in the meat product.

Although FIG. 1 illustrates the gas application, hold, and release steps as separate steps, the time for performing each step may be very short. Applying and releasing the pH increasing gas may be done almost instantaneously, with the operating period representing the short time between pressurization and release. Short treatment times or operating periods are obtained according to the invention by using an operating pressure that is at or above the equilibrium vapor pressure or vapor pressure of the treatment gas at the temperature of the meat product being treated. For example, when the meat product is held at 38° F. and the pH increasing gas comprises $NH_3$ gas, the operating pressure must be 55.7 psig or more to produce the desired pH increase in a short period of time, on the order of one to thirty seconds or less. At 60° F., the operating pressure would be at or above 92.9 psig for treatment using $NH_3$ gas. At higher operating pressures, between 2,500 to 3,000 psi, for example, the operating period may be less than 1 second to achieve a significant pH increase using $NH_3$ as the pH increasing gas. The preferred operating pressure ranges from 2000 psi to 4500 psi, while the temperature of the meat product being treated is maintained in the temperature ranging from 33 degree F. to 110 degree F. In any event, the operating pressures at or above the vapor pressure of the treatment gas at the temperature of the meat product being processed allow for operating periods less than three minutes, and this reduction in treatment time eliminates any adverse effect on the texture of the meat product.

The method 4 shown in FIG. 1 concludes with step 8, removing the pH increasing treatment gas from the meat product being processed. This gas removal step removes the free pH increasing gas but leaves the meat product with the desired increased pH. The gas removal step may include simply applying a vacuum to evacuate the gas or flushing the meat product with an inert food processing gas such as Nitrogen, Oxygen, or Helium. With either applying a vacuum or flushing with an inert gas the method may additionally include applying heat to the meat product being processed to help remove excess treatment gas.

$NH_3$ gas is the preferred pH increasing gas for use in the first step of the invention shown in FIG. 1. When in contact with the meat product being processed, it is believed that the moisture in the meat product absorbs the $NH_3$ gas to form ammonium hydroxide $NH_4OH$. The free hydroxyl ions from the $NH_4OH$ in the meat product produce the increased pH. The free $NH_3$ gas also provides the physical pressure effect desired in the pressurization, hold, and release cycle according to the invention. Alternatively to $NH_3$ gas, a suitable pH increasing liquid or solid may be atomized or otherwise mixed with an approved inert food processing carrier gas such as Nitrogen, Helium, or Oxygen. In this case the pH increasing material performs the pH increasing function while the carrier gas produces the desired physical pressure effects of damaging microbes in the pressurization, hold, release cycle.

The method 4 shown in FIG. 1 also shows at block 9, the step of packaging the treated meat product. This packaging step may be performed after treating the meat product to increase its pH, and before shipping the product. Packaging is particularly useful for larger cuts of meat that may be shipped fresh, without being frozen. The packaging material may be any suitable plastic, such as a polystyrene base (not shown) on which a cut of meat may be placed, with a thin PVC wrap placed over the meat and base. The atmosphere in the package may contain a low concentration of the pH increasing gas to help maintain the pH level of the meat. A suitable material may be impregnated with the pH increasing gas and placed in the package to slowly release the gas during shipment or storage.

The same pressurization, hold, and release cycle shown in FIG. 1 may be employed for decreasing the pH of the treated meat product. However, in this cycle the treatment gas comprises a suitable pH lowering gas such as carbon dioxide gas or a suitable liquid or solid pH lowering material dispersed in a suitable carrier gas. The method includes placing the treated meat product with increased pH in contact with the pH lowering gas at a neutralizing pressure, holding the pressure for a neutralizing period, and releasing the pressure after the desired period. As with the release step in the pH increasing method, the release step in the pH lowering method preferably comprises releasing the pressure substantially instantaneously to physically stress the microbes in the meat product. The neutralizing pressure is preferably a pressure above the vapor pressure of the treatment gas at the temperature of the meat product being processed.

As with the pH increasing method according to the steps shown in FIG. 1, the pH lowering method preferably concludes with the step of removing the pH lowering treatment gas from contact with the meat product being processed. This step may include subjecting the meat product to a vacuum or flushing the meat product with an inert food processing gas. Additionally the step of removing the treatment gas may include heating the meat product to help remove excess pH lowering gas from the meat product, additional pH increasing gas, or their reaction products.

THE TREATMENT APPARATUS

Figure 2:
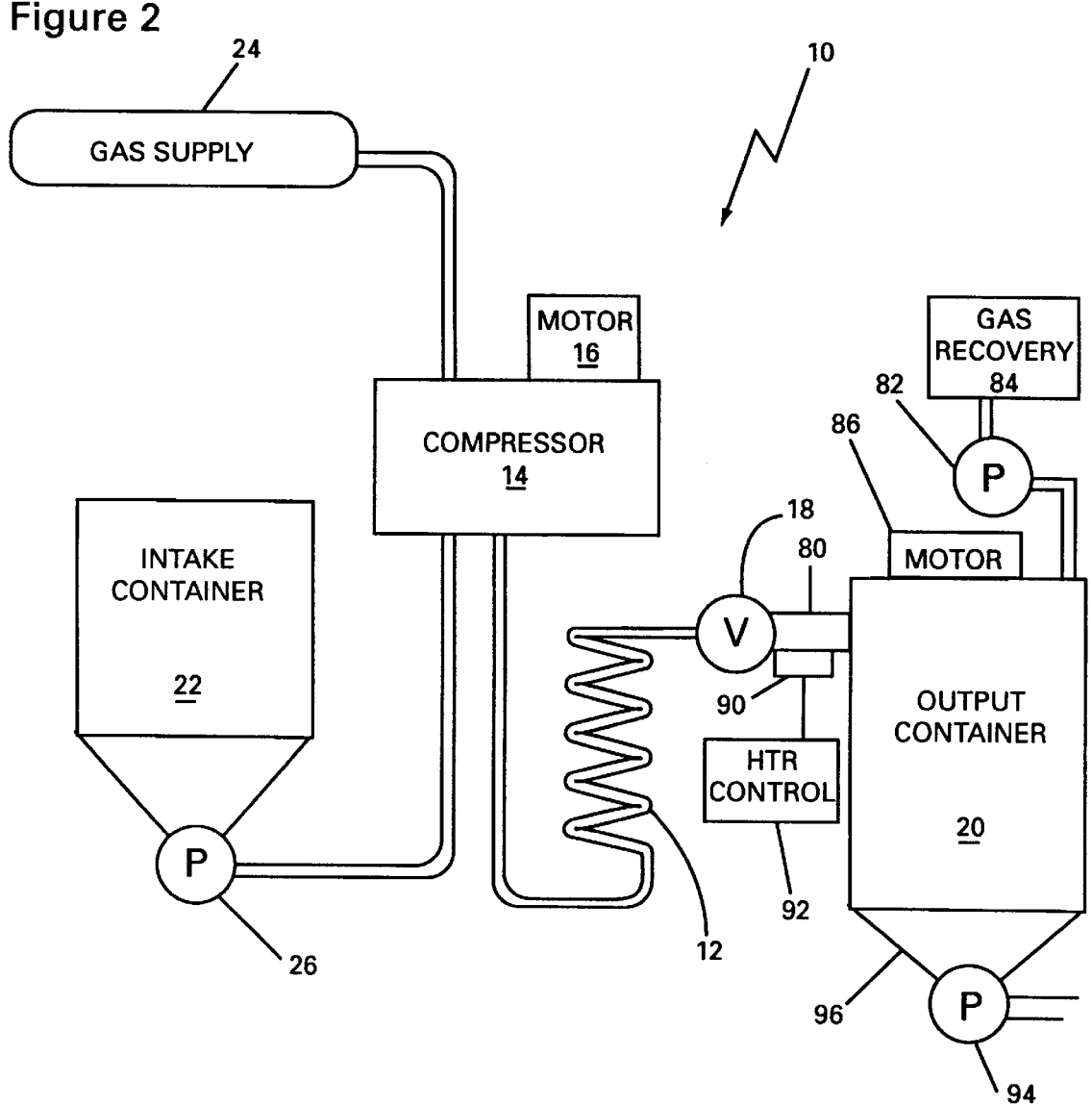
FIG. 2 is a mostly diagrammatic view of an apparatus for performing a method embodying the principles of the invention in a continuous process.
Figure 3:
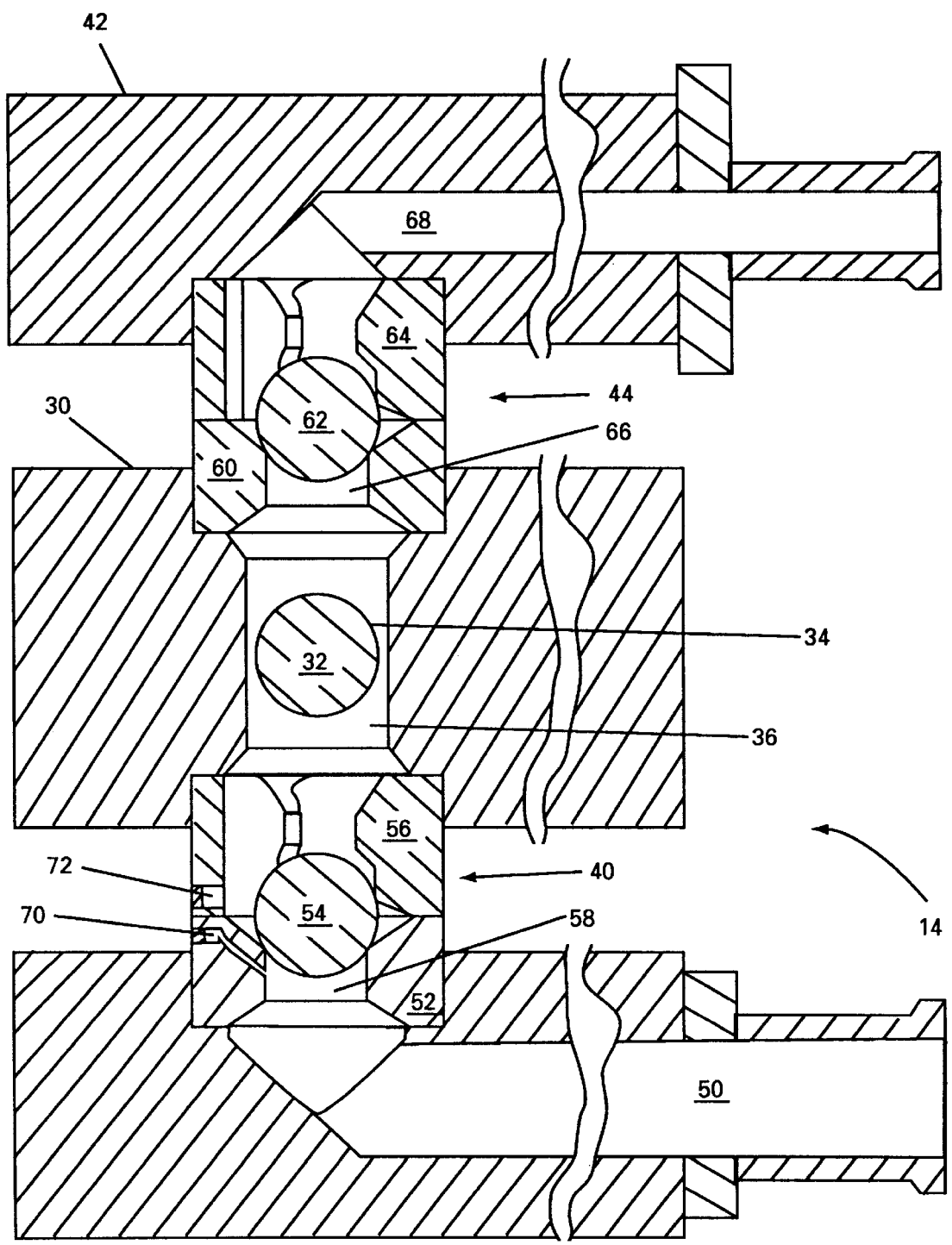
FIG. 3 is a partial longitudinal section view of the compressor used in the apparatus shown in FIG. 2.

FIGS. 2 and 3 show a preferred apparatus 10 for processing ground meat, or the like, according to the method of the invention. Referring to FIG. 2, the apparatus 10 includes means, in this case processing conduit 12, for containing the meat product and treatment gas under the desired operating pressure. The pressure is applied by a compressor or pump 14 driven by a suitable motor 16. A flow-restricting valve or other device 18 is associated with the conduit 12 for holding a back-pressure against the pressure applied by the compressor 14. The flow-restricting valve 18 opens to an output container 20, which is used in removing excess treatment gas from the meat product. The meat product to be processed in the apparatus 10 is pumped from an in-take container 22 by feed pump 26 to the compressor 14, and the treatment gas supply 24 provides treatment gas which is then compressed in contact with the meat product.

When the container comprises the conduit 12, travel time of the meat product and treatment gas through the conduit allows the meat product to be held under the operating pressure for a relatively long operating period. Thus this illustrated form of the invention provides for continuous processing with continuous meat product intake, compression with the treatment gas, holding under the operating pressure, and then pressure release. In this continuous processing form of the invention, other processing equipment may be connected in the conduit 12 or elsewhere for performing other functions on the meat product before the treatment gas pressure is released at device 18.

FIG. 3 illustrates the preferred compressor or pump 14. The compressor 14 includes a cylinder head 30 with a piston 32 adapted to reciprocate within a cylinder 34 which opens into a chamber 36 in the cylinder head. As seen from the perspective of FIG. 3, the piston 32 would move transverse to the plane of the paper. An inlet manifold 38 is connected to the cylinder head 30 with an inlet valve 40, and an outlet manifold 42 is connected to the cylinder head via an outlet valve 44. Although FIG. 3 is broken away to show only one piston and cylinder arrangement in the cylinder head 30, it will be readily apparent to those skilled in the art that the compressor 14 could, and preferably would, include additional piston and cylinder arrangements. In one preferred form, the compressor 14 includes three separate pistons.

The inlet manifold 38 includes an inlet manifold passage 50 through which the meat product reaches the inlet valve 40. The illustrated inlet valve 40 is a check valve comprising a seat 52, ball 54, and ball retainer 56, and defines an inlet passage 58 to the cylinder head chamber 36. Similarly, the outlet valve 44 comprises a check valve having a seat 60, ball 62, and ball retainer 64, and defines an outlet passage 66 connecting the cylinder head chamber 36 to a passage 68 extending through the outlet manifold 42.

The treatment gas is preferably supplied to the compressor 14 for compressing with the meat products, even though in other forms of the invention the treatment gas may simply be applied to the meat products under the desired operating pressure. The illustrated form of the invention shows two alternate injection points for injecting treatment gas to place the treatment gas in contact with the meat products being processed. The first treatment gas injection port 70 extends through the seat 52 of the inlet valve 40 on the inlet manifold side of the inlet valve ball 54. Treatment gas injected into the inlet manifold passage 50 through this first injection port 70 under a suitable pressure is drawn into the cylinder head chamber 36 along with the meat product. The alternate, second injection port 72 extends into the inlet passage 58 on the cylinder head side of the inlet valve ball 54. Thus the treatment gas injected through this second port 72 is injected directly into the cylinder head chamber 36 for compressing with the meat products.

Referring again to FIG. 2, after releasing the treatment gas pressure at valve 18, the treated meat product travels through output conduit 80 to the output container 20. The excess treatment gas removal step described with reference to FIG. 1 (block 8) may be performed by applying a vacuum to container 20 with vacuum pump 82. The vacuum pump 82 may discharge into a gas recovery system 84 for recovering the treatment gas or for disposing of the gas. Also, the container 20 may have associated with it a motor 86 for driving an agitator or blender mechanism (not shown) within the container. Blending or agitating the treated meat product in the container helps expose the meat product to the vacuum to ensure better removal of excess or free treatment gas. In addition to the application of a vacuum and the agitation of the meat product, the product may be heated to a desired temperature to help release treatment gas. The heat may be applied by a heating element as the meat product travels through the output conduit 80. The heating element 90 is associated with the conduit 80 and may be controlled through a heater control 92. The heat may be applied electrically or with any other suitable heating device to heat the meat to a desired temperature. Also, heat may be applied earlier in the process if desired. For example, the meat product may be heated in conduit 12 by a suitable process.

The treated meat product is removed from the container 20 through a suitable pump 94 mounted at the bottom of a hopper 96, which forms the bottom of container 20. Alternatively to the pump 94, an auger may be used to remove meat product from container 20. In any event, the pump or auger is operated at a rate sufficient to maintain a level of meat product in the container 20. Maintaining a level of meat product in the bottom of container 20 allows better control of the vacuum applied to the container through vacuum pump 82.

The treated, pH increased meat product which is produced by apparatus 10 will commonly be subjected to further processing for storage or shipment. For example, the meat product may be tempered and put through a suitable process for separating fat from lean meat. Also, the final lean meat product may be frozen and chipped for packaging and shipment.

The operation of apparatus 10 may now be described with reference to FIGS. 2 and 3. The apparatus 10 shown in FIG. 2 uses the reciprocating piston pump or compressor 14 to place the meat products in contact with the treatment gas under the operating pressure. As shown in FIG. 2, the feed pump 26 pumps meat product from the intake container 22 to the inlet manifold passage 50 (FIG. 3) of the compressor 14 under an inlet pressure. Referring now to FIG. 3, as the piston 32 withdraws into the cylinder 34, it creates a low pressure in the cylinder head chamber 36 causing the ball 62 of the outlet valve 44 to seat and the ball 54 of the inlet valve 40 to unseat, drawing meat product into the cylinder head from the inlet manifold passage 50. When the first treatment gas injection port 70 is used, treatment gas is injected into the inlet manifold passage 50 and the treatment gas is drawn into the cylinder head chamber 36 along with the meat product. Alternatively, when the second port 72 is used, the treatment gas is injected directly into the cylinder head chamber 36 preferably during the intake stroke of the piston 32 or just as the piston starts on the compression stroke. In either case, when the piston 32 returns through the cylinder 34 in the compression stroke, it increases the pressure in the cylinder head chamber 36 causing the inlet ball 54 to seat in the inlet valve 38. The pressure continues to rise in the cylinder head chamber 36 until the pressure passes the pressure held in the outlet manifold passage 66 and processing conduit 12 by the flow restricting back-pressure device 18. At this point, the outlet valve ball 62 unseats to allow the meat products and treatment gas under the operating pressure to move into the outlet manifold passage 66.

The pumping or compressing process continues each cycle of the piston 32 to compress meat product and treatment gas and transport the compressed treatment gas and meat product through the outlet manifold passage 66 and into the processing conduit 12. In this continuous pressurizing, holding, and releasing process, the pump speed and the processing conduit length are chosen to provide travel time of the meat product and compressed treatment gas in the processing conduit 12 equal to the required operating period to produce the desired pH altering effect in the meat products.

After holding the meat products in contact with the treatment gas under the operating pressure for the operating period, the method continues with the step of releasing the pressure across the flow restricting device 18. Preferably, the pressure is released substantially instantaneously across the device 18 as the meat product is delivered into the output container 20. The step of removing the treatment gas may be performed in the output container 20 by applying the desired vacuum to the container with vacuum pump 82 alone and preferably by agitating the material in the container 20 with a suitable blender mechanism (not shown) driven by motor 86. Heat may be applied to the meat product through heater 90 to assist in treatment gas removal under the vacuum.

Alternatively to the continuous processing method possible with the apparatus 10 shown in FIGS. 2 and 3, the method of the invention encompasses a batch process. In this batch process, the step of placing the meat product in contact with the treatment gas under the operating pressure includes placing the meat product in a pressure vessel and then applying the treatment gas under the operating pressure. The operating pressure is then simply held on the pressure vessel for the operating period. This batch method is preferable, or may be required, for some meat products that cannot easily be passed through the valves of a reciprocating compressor as shown in FIG. 3. In particular, the batch processing method may be required for large cuts of meat. In any event, in the batch process, the step of releasing the pressure may be accomplished simply by releasing treatment gas pressure through a suitable pressure release valve associated with the pressure vessel.

After treatment to increase the pH of the meat product, particularly larger cuts of meat may be packaged in suitable packaging. The packaging process also provides an opportunity for initially treating the meat product to increase its pH. That is, alternatively to applying the pH increasing gas to the meat in the conduit 12 shown in FIG. 2 or a pressure vessel, which can both accommodate high treatment pressures, the treatment gas may be applied at low pressure during packaging to produce the desired increased pH. The packaging may be performed in a low pressure treatment gas environment, or the pH increasing gas may be released in the sealed package by a suitable mechanism. This latter method of releasing the pH increasing gas in the meat package itself essentially uses the package as a treatment vessel. The pH increasing gas may be released into the package from a suitable gas carrier material such as a plastic impregnated with the treatment gas, such as $NH_3$. $NH_3$ gas can also be released from water held in the package in a suitable water retaining material such as a sponge material or paper product. In either case, the low pressure pH increasing gas atmosphere in the package itself produces the desired increased pH in the meat product to retard microbial activity.

Operating or neutralizing pressures at near atmospheric pressure provide significant pH effect. However, the lower operating pressures require longer operating periods to produce a given pH modification. Alternatively, relatively high operating or neutralizing pressures, from at or above the vapor pressure of the treatment gas at the temperature of the meat being processed to several thousand psi may be employed in the method of the invention to produce the desired pH effect at a shorter operating period and also to produce microbe kill by physically stressing the microbes. Also, multiple pressurization, hold, and release cycles may be employed within the scope of the invention to produce the desired pH altering effects. The different pressurization cycles may have different pressure, duration, and treatment gas all within the scope of the invention.

Figure 4:
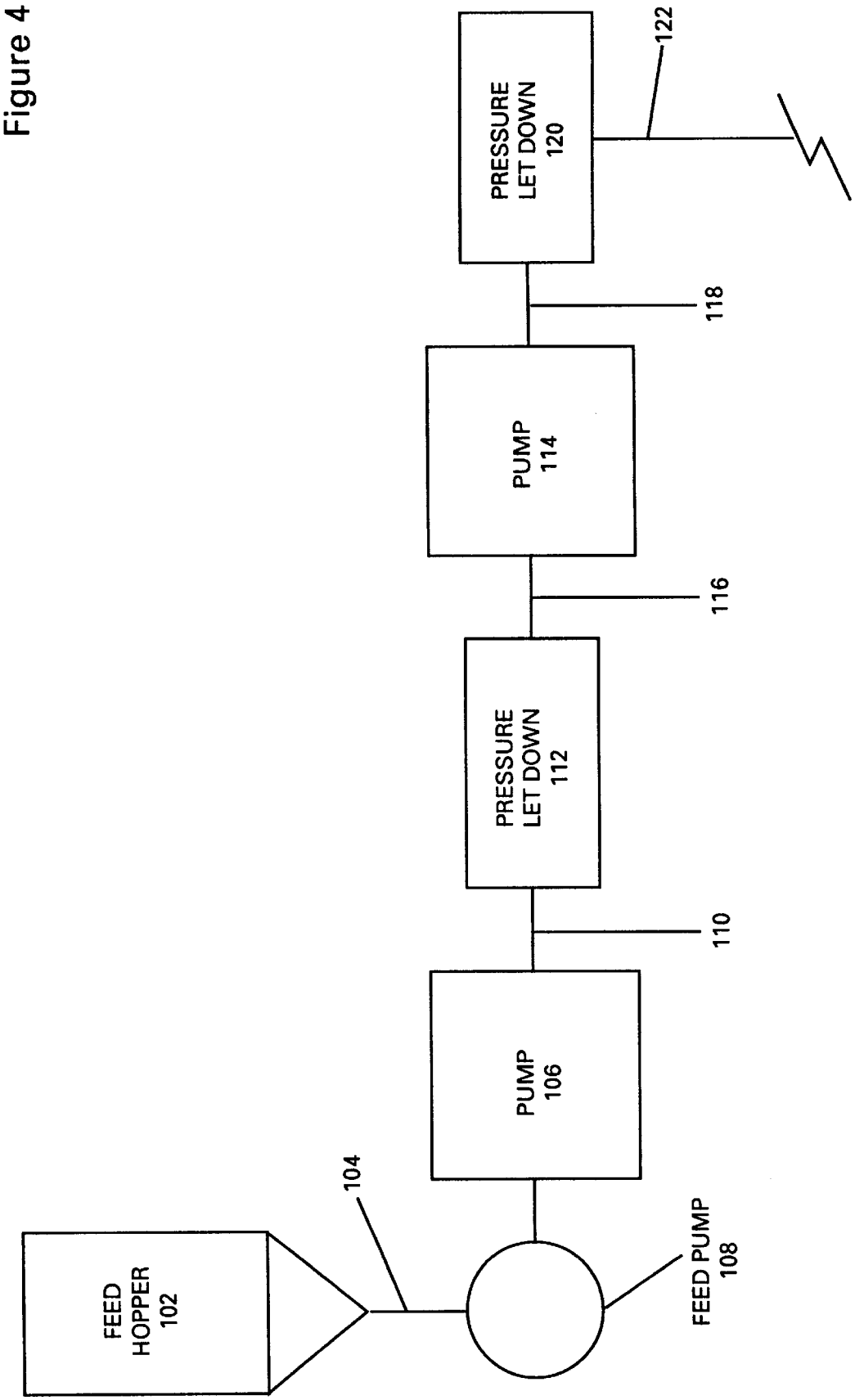
FIG. 4 is a diagrammatic representation of an apparatus embodying the principles of the invention for performing back-to-back pH increasing and pH lowering according to the invention.
Figure 5:
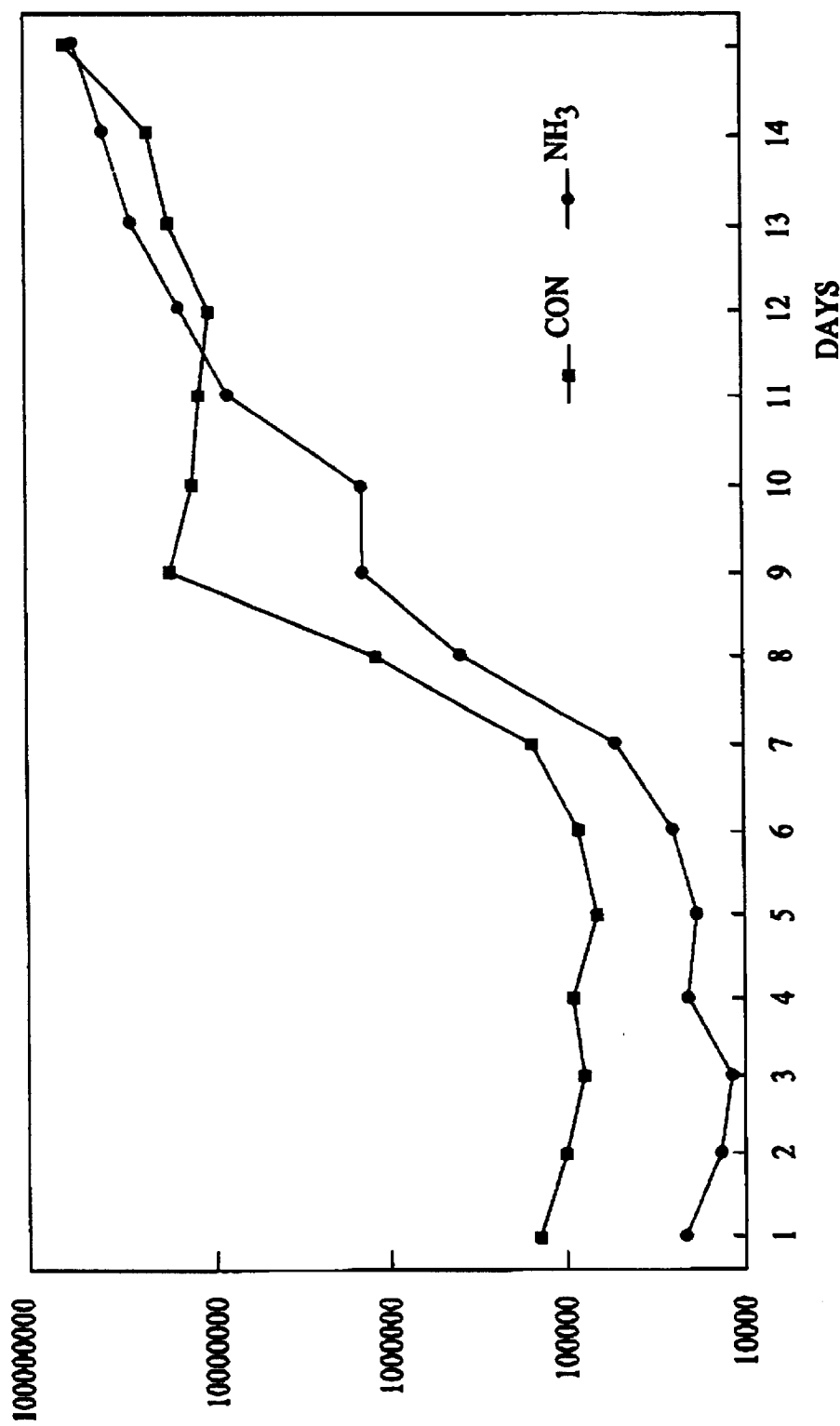
FIG. 5 is a graph of total plate count over time measured in days for a sample treated as described in Example 2 below, and for a control sample.

FIG. 4 illustrates an apparatus 100 for performing the pH increasing process back-to-back with the pH lowering process according to the invention. The apparatus 100 includes a feed hopper 102 connected by conduit 104 to a first processing pump or compressor 106. The first processing pump 106 may be similar to the pump 14 shown in FIGS. 2 and 3. A feed pump 108 may be positioned in the conduit 104 for feeding meat product to the first processing pump 106 under a suitable feed pressure.

In the illustrated back-to-back treatment apparatus 100, a conduit 110 connects the output of the first processing pump 106 to a suitable pressure let down arrangement 112. Although pressure reduction is not necessary at this point, it is preferable to reduce the pressure with the pressure let down arrangement 112 to a relatively low pressure for introducing the meat being processed through conduit 116 to the second processing pump/compressor 114. This second processing pump 114 may also comprise a pump similar to pump 14 shown in FIGS. 2 and 3. Conduit 118 connects the output from the second processing pump 114 to a second pressure let down arrangement 120 which may comprise a hopper arrangement similar to the hopper 20 shown in FIG. 2. The second pressure let down arrangement 120 preferably reduces the pressure on the meat being processed to around atmospheric pressure. An output conduit 122 may direct the processed meat product to a suitable freezer, for example, or other processing equipment.

The first processing pump 106 is used to introduce the pH increasing gas and apply the operating pressure as discussed with reference to FIG. 1. The pH increased meat product is then treated with the pH lowering gas introduced in the second pump 114, preferably after the pressure on the meat product is reduced in the first pressure let down arrangement 112. The second pump 114 applies the desired neutralizing pressure. In the preferred form of the invention, the pH increasing gas utilized in pump 106 is $NH_3$ gas and the pH lowering gas is $CO_2$ gas. The operating pressures in each of the pumps 106 and 114 are limited to pressures at or above the vapor pressure of the particular gas at the temperature of the meat being processed. However, much higher treatment pressures on the order of 2,000 or more psi are useful for maximizing the pH modifying effect and producing maximum physical stress on the microbes already existing in the meat product.

EXAMPLE NO. 1

The method of improving the quality of meat according to the invention was tested in the production of Lean Finely Textured Beef from trimmings consisting of lean meat and approximately 70% fat. Pure anhydrous $NH_3$ gas was injected into trimmings being processed through a pump apparatus similar to the apparatus shown best in FIG. 3. The $NH_3$ gas was injected into the pump through a port just prior to the piston compression stroke, resulting in an immediate distribution of the gas to the product under pressure. The pump outlet was to a conduit similar to conduit 12 shown in FIG. 2, in which pressure was maintained at approximately 4,000 psi through an outlet orifice which performed the back pressure function of the outlet valve 18 shown in FIG. 2. The flow rate through the pump and conduit held the $NH_3$ gas in contact with the trimmings for approximately 2 to 2.5 minutes. Through the compression process, the material was held at a temperature of approximately 40° F. While being held at the elevated pressure, the material was tempered from 40° F. to 108° F. and then the pressure was reduced at the orifice. The treated and heated material was then centrifuged to remove fat, leaving a lean portion with 4% to 6% fat, which was then frozen, chipped, and packaged. Also, the identical process was performed for a control, without any $NH_3$ gas injection.

Control and test samples were tested for pH, color, total plate count, Coliform, *E. Coli*, Salmonella, and Listeria. Additionally, sensory evaluations were conducted for flavor and odor. The samples were taken from the lean portion product immediately after freezing.

The pH of the material injected with $NH_3$ was 7.45, as compared to 6.36 for the untreated product. Thus, the $NH_3$ gas treatment provided a 17.14% increase in pH in the finished product after freezing.

Color analysis was conducted on the finished product after freezing, using a HUNTER™ color spectrocolorimeter. The control product had an a-value or a redness of 18.0. The product treated with $NH_3$ had an a-value or redness of 21.0. Thus, the $NH_3$ treatment provided a 16.67% increase in desirable red color, over the control product. This improved color remained after 7 days' storage at 0° F., without any sign of oxidation or discoloration.

Total plate count in the control product was 31,667 cfu/g, while the total plate in the $NH_3$ treated material was 10,925 cfu/g. Thus, the $NH_3$ treatment produced a 65.50% reduction in total plate count.

The coliform count in the control product was at 2,047 cfu/g, as compared to 588 cfu/g for the treated meat product. Thus, the $NH_3$ gas treated product had a 71.12% reduction in coliform count.

The *E. Coli* in the control product was at 1,393 cfu/g, while the $NH_3$ treated product was at 358 cfu/g. This represents a 74.30% reduction in *E. Coli* count in the treated material, as compared to the untreated product.

There were no statistical changes in Salmonella counts or Listeria counts resulting from the test.

Finally, both the control and test products were cooked and evaluated for flavor and aroma. The sensory tests for flavor and aroma found no detectible differences between the control and $NH_3$ treated product. Particularly, the $NH_3$ treated product had no detectible $NH_3$ aroma, either while thawing, during cooking, or after being cooked. Also, the $NH_3$ treatment and increased pH did not affect the taste of the cooked product as compared to the untreated product. However, the treated meat product retained more juice during cooking.

The results from this test show significant increases in color and pH by treating the meat product with anhydrous $NH_3$ gas according to the invention. The test also shows very significant deceases in microbial counts, using the $NH_3$ gas treatment process. These benefits were realized without any detectible changes in the finished product flavor or aroma and with increased juice retention during cooking.

EXAMPLE NO. 2

In another test conducted in the production of Lean Finely Textured Beef, total plate count, total Coliform, total *E.Coli*, and total Staph Aureus were determined on samples taken over a period of fourteen days. The trimmings, consisting of lean meat and approximately 70% fat, were treated with $NH_3$ gas as described in Example No. 1. After freezing, however, the Lean Finely Textured Beef was placed in a refrigerator maintained at approximately 36° F. to 40° F. A control product was produced using the identical method but without the application of $NH_3$, and the control product was also placed in the refrigerator and maintained at 36° F. and 40° F. The graphs shown in FIGS. 5–8 plot the results of the testing for total plate count, total *E.Coli*, total Coliform, and total Staph Aureus. Tests were conducted daily on samples taken from both the $NH_3$ treated product and the control, untreated product.

The test results shown in the graphs set out in FIGS. 6–8 show a striking reduction in *E.Coli*, Coliform, and Staph Aureus counts in the $NH_3$ treated product, treated according to the invention. Even more striking though is the effect of the $NH_3$ treatment on total plate count, shown in FIG. 5. Initially and over the first seven days, total plate count in the $NH_3$ treated product is significantly lower than in the untreated control. After the seventh day, total plate count in both treated and untreated products increased greatly with the $NH_3$ treated product even surpassing the control at approximately the twelfth day. However, a comparison of FIG. 5 and FIGS. 6–8 shows that *E.Coli*, Coliform, and Staph Aureus counts remained low in the $NH_3$ treated product throughout the entire fourteen day period. This means that the microbes contributing to the increased plate count in the $NH_3$ treated product after the seventh day were not the potentially dangerous *E.Coli*, Coliform, and Staph Aureus strains, but rather were relatively benign strains. It appears that the benign strains of microbes outperform the other strains in the pH increased meat product.

The above described preferred embodiments are intended to illustrate the principles of the invention, but not to limit the scope of the invention. Various other embodiments and modifications to these preferred embodiments may be made by those skilled in the art without departing from the scope of the following claims. For example, the vacuum for helping to remove excess treatment gas may be applied in the output conduit 80 or at some other point in the process rather than in the output container 20 as discussed above. Also, heat may be applied as desired while the material being processed passes through the output conduit 80, or at any other suitable point in the process such as in the output container 20 or in the treatment conduit 12 shown in FIG. 2.

I claim:

1. A method of improving the quality of a meat product, the method comprising the step of:

(a) placing a pH increasing gas comprising $NH_3$ gas at an operating pressure in contact with the surface of the meat product for an operating period of less than three minutes, the operating pressure being a pressure at or above the vapor pressure of the pH increasing gas at the temperature of the meat product.

2. The method of claim 1 further comprising the step of:

(a) removing the pH increasing gas from the surface of the meat product after the operating period.

3. The method of claim 2 wherein the step of removing the pH increasing gas from the surface of the meat product comprises the step of:

(a) placing the meat product under a vacuum.

4. The method of claim 2 wherein the step of removing the pH increasing gas from the surface of the meat product comprises the step of:

(a) blending the meat product while the meat product is placed under a vacuum.

5. The method of claim 2 wherein the step of removing the pH increasing gas from the surface of the meat product comprises the steps of:

(a) heating the meat product; and (b) placing the meat product under a vacuum.

6. The method of claim 2 further comprising the step of:

(a) placing a pH lowering gas in contact with the surface of the meat product for an operating period sufficient to reduce the pH of the meat product.

7. The method of claim 6 wherein the pH lowering gas comprises carbon dioxide gas.

8. The method of claim 6 wherein the pH lowering gas is placed in contact with the meat product at a neutralizing pressure at or above the vapor pressure of the pH lowering gas at the temperature of the meat product and further comprising the steps of:

(a) releasing the pH lowering gas in contact with the surface of the meat product from the neutralizing pressure; and (b) removing the pH lowering gas from the surface of the meat product after the step of releasing the pH lower gas from the neutralizing pressure.

9. The method of claim 1 wherein the operating pressure is in a range from 2,000 to 4,500 psi and the temperature of the meat product is in a range 33° F. to 110° F.

10. The method of claim 9 further comprising the steps of:
(a) removing the pH increasing gas from the surface of the meat product after the operating period;
(b) after the pH increasing gas is removed, placing a pH lowering gas at a neutralizing pressure in a range from 2,000 to 4,500 psi in contact with the surface of the meat product while the meat product is maintained in a temperature range from 33° F. to 110° F.; and
(c) releasing the pH lowering gas in contact with the surface of the meat product from the neutralizing pressure.

11. The method of claim 1 further comprising the step of:
(a) placing a pH lowering gas in contact with the surface of the meat product for an operating period sufficient to reduce the pH of the meat product.

* * * * *